(12) United States Patent
Tsuchiya

(10) Patent No.: US 11,322,035 B2
(45) Date of Patent: May 3, 2022

(54) INFORMATION PROCESSING METHOD, STORAGE MEDIUM, INFORMATION PROCESSING DEVICE, AND INFORMATION PROCESSING SYSTEM

(71) Applicant: TOYOTA JIDOSHA KABUSHIKI KAISHA, Toyota (JP)

(72) Inventor: Yuichiro Tsuchiya, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 426 days.

(21) Appl. No.: 16/271,051

(22) Filed: Feb. 8, 2019

(65) Prior Publication Data

US 2019/0266908 A1 Aug. 29, 2019

(30) Foreign Application Priority Data

Feb. 23, 2018 (JP) .............................. JP2018-030697

(51) Int. Cl.
*G09B 7/00* (2006.01)
*G09B 19/16* (2006.01)
*G09B 9/04* (2006.01)
*G06F 16/30* (2019.01)

(52) U.S. Cl.
CPC .............. *G09B 7/00* (2013.01); *G06F 16/30* (2019.01); *G09B 9/04* (2013.01); *G09B 19/167* (2013.01)

(58) Field of Classification Search
CPC ... G06F 16/90332; G06F 16/30; G06F 16/345
See application file for complete search history.

(56) References Cited

U.S. PATENT DOCUMENTS

| | | | |
|---|---|---|---|
| 2009/0112828 A1* | 4/2009 | Rozenblatt | G06F 16/3338 |
| 2010/0191686 A1* | 7/2010 | Wang | G06F 16/33 706/46 |
| 2013/0041921 A1* | 2/2013 | Cooper | G06F 16/3338 707/780 |
| 2015/0356181 A1* | 12/2015 | Dettman | G06F 16/9535 707/728 |

FOREIGN PATENT DOCUMENTS

| | | | |
|---|---|---|---|
| JP | 2005-128608 A | 5/2005 |
| JP | 2006-244262 A | 9/2006 |
| JP | 4008313 B2 | 11/2007 |
| JP | 2013-250925 A | 12/2013 |

* cited by examiner

*Primary Examiner* — Malina D. Blaise
*Assistant Examiner* — Elizabeth Verniers Johnson
(74) *Attorney, Agent, or Firm* — Oliff PLC

(57) ABSTRACT

An information processing method includes: acquiring, by an information processing device, user's input information including a question sentence about a vehicle; and outputting, by the information processing device, an answer sentence according to a detail level, the detail level being an index indicating a detail degree of a sentence, and the detail level being determined based on a characteristic value of the question sentence.

6 Claims, 6 Drawing Sheets

| RANGE OF CHARACTERISTIC VALUE OF QUESTION SENTENCE | DETAIL LEVEL | RANGE OF CHARACTERISTIC VALUE OF ANSWER SENTENCE |
|---|---|---|
| 1 OR MORE AND LESS THAN 50 | 1 | 1 OR MORE AND LESS THAN 30 |
| 50 OR MORE AND LESS THAN 100 | 2 | 30 OR MORE AND LESS THAN 60 |
| 100 OR MORE | 3 | 60 OR MORE |

FIG. 2

| RANGE OF CHARACTERISTIC VALUE OF QUESTION SENTENCE | DETAIL LEVEL | RANGE OF CHARACTERISTIC VALUE OF ANSWER SENTENCE |
|---|---|---|
| 1 OR MORE AND LESS THAN 50 | 1 | 1 OR MORE AND LESS THAN 30 |
| 50 OR MORE AND LESS THAN 100 | 2 | 30 OR MORE AND LESS THAN 60 |
| 100 OR MORE | 3 | 60 OR MORE |

FIG. 4

| QUESTION SENTENCE | DETAIL LEVEL | ANSWER SENTENCE |
|---|---|---|
| WHAT IS THIS EVENT? | 1 | IT IS EVENT P. |
| WHAT IS THIS EVENT THAT OCCURRED AFTER DOING OPERATION A? | 2 | IT IS EVENT P. THE EVENT OCCURS WHEN THE VEHICLE IS IN STATE Q. |
| WHAT IS THIS EVENT THAT OCCURRED AFTER DOING OPERATION A AFTER DOING OPERATION B? | 3 | IT IS EVENT P. THE EVENT OCCURS WHEN THE VEHICLE IS IN STATE Q. PLEASE DO OPERATION R. |

FIG. 5

| QUESTION SENTENCE | DETAIL LEVEL | ANSWER SENTENCE |
|---|---|---|
| THE KEY MARK IS LIT ON THE CAR | 1 | THE IMMOBILIZER IS IN OPERATION. DO NOT LEAVE THE KEY INSIDE THE CAR WHEN LEAVING THE CAR |
| THE KEY MARK IS LIT ON THE CAR. WHAT IS THIS? | 2 | THIS IS THE OPERATION INDICATOR OF THE IMMOBILIZER. THE ENGINE IS STARTED ONLY BY THE PREVIOUSLY REGISTERED KEY. DO NOT LEAVE THE KEY INSIDE THE CAR WHEN LEAVING THE CAR |
| THE KEY MARK IS DISPLAYED ON THE METER OF THE CAR WHEN THE CAR IS STOPPED. WHEN IS THIS KEY MARK DISPLAYED? | 3 | THIS IS THE OPERATION INDICATOR OF THE IMMOBILIZER. WHEN THE POWER SWITCH IS TURNED OFF, THE INDICATOR FLASHES TO INFORM ABOUT THE OPERATION OF THE IMMOBILIZER SYSTEM |

FIG. 6

| QUESTION SENTENCE | DETAIL LEVEL | ANSWER SENTENCE |
|---|---|---|
| I WANT TO STOP THE TERRIBLE NOISE FROM THE CAR. | 1 | THE INTRUSION-DETECTION AUTOMATIC ALARM IS ACTIVATED. UNLOCK THE DOOR OR TURN ON THE POWER SWITCH IF YOU ARE INSIDE THE CAR |
| A BIG ALARM SOUNDED FROM THE CAR. WHAT HAPPENED? | 2 | THE INTRUSION DETECTION AUTOMATIC ALARM IS ACTIVATED. THERE IS A POSSIBILITY THAT THE ALARM HAS RESPONDED TO A PERSON OR A PET LEFT IN THE CAR |
| I WAS IN THE CAR FOR A WHILE AFTER PARKING AND A TERRIBLE ALARM SOUNDED WHEN I TRIED TO GET OUT OF THE CAR. I THINK IT IS PROBABLY INTRUSION DETECTION. WHY DID IT WORK? | 3 | THE AUTOMATIC ALARM SOMETIMES WORKS WHEN A PERSON IN THE CAR UNLOCKS THE DOOR, OR OPENS THE HOOD OR THE TRUNK, WITH THE LOCK LEVER. THE AUTOMATIC ALARM MAY ALSO BE ACTIVATED WHEN YOU LEAVE BEHIND A THING MOVING IN THE CAR |

INFORMATION PROCESSING METHOD, STORAGE MEDIUM, INFORMATION PROCESSING DEVICE, AND INFORMATION PROCESSING SYSTEM

INCORPORATION BY REFERENCE

The disclosure of Japanese Patent Application No. 2018-030697 filed on Feb. 23, 2018 including the specification, drawings and abstract is incorporated herein by reference in its entirety.

BACKGROUND

1. Technical Field

The present disclosure relates to an information processing method, a storage medium, an information processing device, and an information processing system.

2. Description of Related Art

An information processing technique for automatically answering a user-entered question sentence is known. For example, Japanese Patent Application Publication No. 2013-250925 (JP 2013-250925 A) discloses a technique for estimating the answer type of an estimation target question sentence based on the learned answer type models and the characteristic amount vector of the estimation target question sentence. In addition, Japanese Patent Application Publication No. 2006-244262 (JP 2006-244262 A) discloses a technique for determining whether question sentences have the similar content based on the degree of similarity between the question sentence included in a retrieved exemplary question/answer sentence and a new question sentence. In addition, Japanese Patent No. 4008313 discloses a technique for extracting a feature that characterizes the question type from the previously prepared samples of question sentences, for converting each question into a feature vector and, when an unknown question is entered, for identifying to which question type the unknown question belongs using the Support Vector Machine based on the feature vector.

SUMMARY

The detail level of an answer sentence that the questioner expects can vary depending on the situation. For example, a user who asks a question about a device may not be interested in the mechanism of the device but may want to know only whether the device state is normal. In such a case, if both the mechanism and the device state are answered, the user may be dissatisfied with the answer. Conversely, a user who asks a question about a device may want to know not only whether the device state is normal but also the cause why the device has led to that state. In such a case, if only the device state is answered, the user may be dissatisfied with the answer.

For this reason, there is a demand for an information processing technology that automatically answers in consideration of the detail level of an answer sentence that the questioner expects. However, the above-described related technologies do not consider the detail level of an answer sentence expected by the questioner and, therefore, do not necessarily meet the recent needs.

The present disclosure provides an information processing method, a program, an information processing device, and an information processing system that automatically answer in consideration of the detail level of an answer sentence expected by the questioner.

An information processing method according to a first aspect of the present disclosure includes: acquiring, by an information processing device, user's input information including a question sentence about a vehicle; and outputting, by the information processing device, an answer sentence according to a detail level, the detail level being an index indicating a detail degree of a sentence, and the detail level being determined based on a characteristic value of the question sentence.

A non-transitory storage medium according to a second aspect of the present disclosure stores a program which causes an information processing device to: acquire user's input information including a question sentence about a vehicle; and output an answer sentence according to a detail level, the detail level being an index indicating a detail degree of a sentence, and the detail level being determined based on a characteristic value of the question sentence.

An information processing device according to a third aspect of the present disclosure includes a control unit configured to: acquire user's input information including a question sentence about a vehicle; and output an answer sentence according to a detail level, the detail level being an index indicating a detail degree of a sentence, and the detail level being determined based on a characteristic value of the question sentence.

An information processing system according to a fourth aspect of the present disclosure includes: an information processing device; and a server configured to communicate with the information processing device, wherein the information processing device is configured to acquire user's input information including a question sentence about a vehicle, the information processing device or the server is configured to determine a characteristic value of the question sentence, the information processing device or the server is configured to determine a detail level that is an index indicating a detail degree of a sentence based on the characteristic value of the question sentence, and the information processing device is configured to output an answer sentence according to the detail level.

According to the aspects of the present disclosure, it becomes possible to provide an automatic answer that takes into consideration the detail level of an answer sentence expected by the questioner.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a diagram showing an example of information stored in a server storage unit;

FIG. 4 is a diagram showing a first example of a question sentence and an answer sentence;

FIG. 5 is a diagram showing a second example of a question sentence and an answer sentence; and FIG. 6 is a diagram showing a third example of a question sentence and an answer sentence.

DETAILED DESCRIPTION OF EMBODIMENTS

Figure 1:
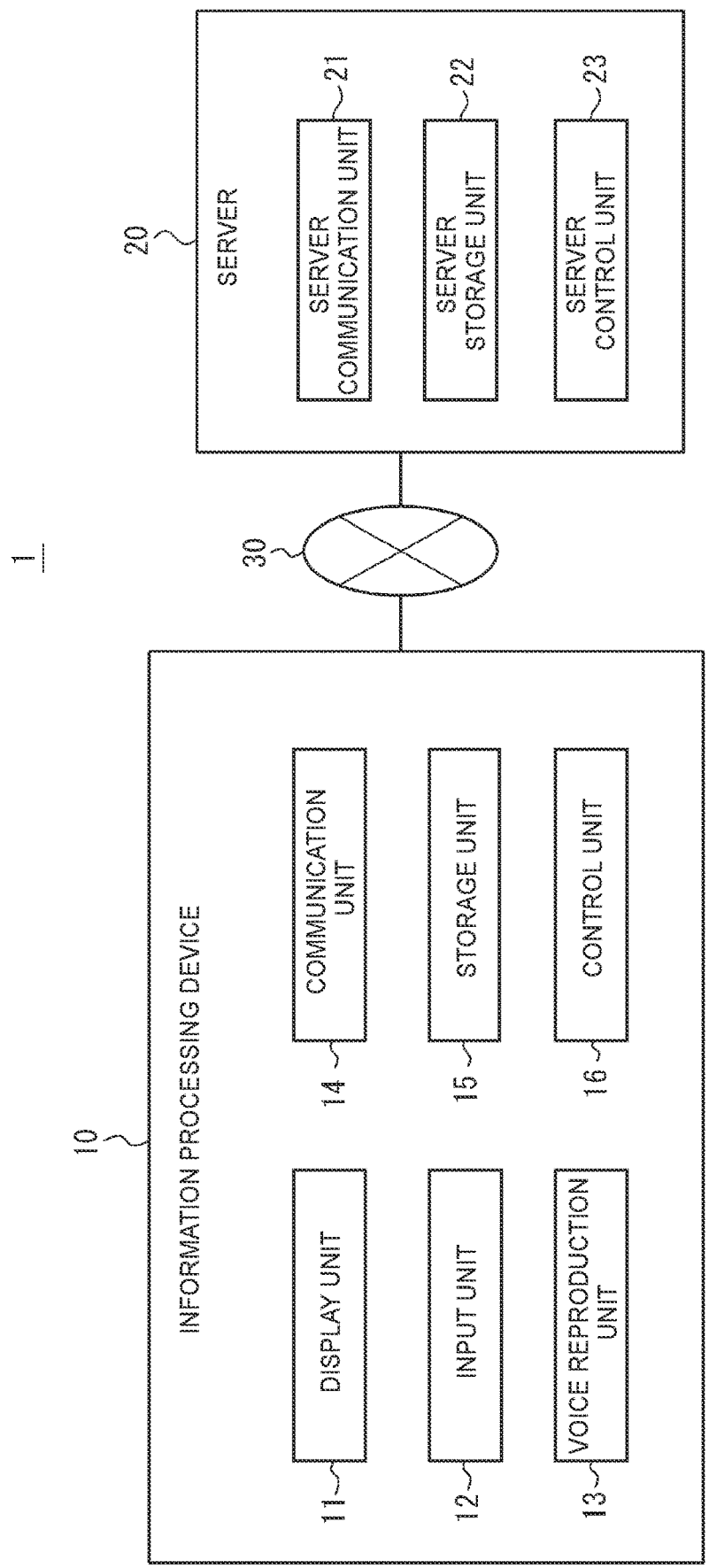
FIG. 1 is a block diagram showing a schematic configuration of an information processing system according to one embodiment of the present disclosure.

An embodiment of the present disclosure will be described below.

(Configuration of information processing system) The outline of an information processing system 1 according to one embodiment of the present disclosure will be described with reference to FIG. 1. The information processing system 1 includes an information processing device 10 and a server 20. The information processing device 10 is, for example, an in-vehicle device such as a navigation device mounted on a vehicle (e.g., an automobile) or may be any device such as a smartphone or a tablet terminal. The information processing device 10 is not limited to those devices but may be any device used by a user. The server 20 is one or a plurality of server devices capable of communicating with each other. For the sake of description, it is assumed in this embodiment that the server 20 is one server device. The information processing device 10 and the server 20 are connected via a network 30 so that they can communicate with each other. The network 30, which includes the Internet, may include any other network.

In the information processing system 1, the information processing device 10 and the server 20 work together to answer a user's question, for example, about a vehicle. Typically, the information processing system 1 acquires user's input information that includes a question sentence about the vehicle. The question sentence may be a character string expressed in natural language. The input information may be a character string entered by a user using the keyboard, or a voice entered by a user using the microphone. In this specification, "voice" refers to a series of sounds having a linguistic meaning. The information processing system 1 recognizes the content of a user's question and, at the same time, detects the characteristic value of the question sentence. In this embodiment, the "characteristic value" of a sentence is, for example, the number of characters, the number of words, the number of content words, or the number of dependencies included in the sentence. However, the characteristic value is not limited to those given above and may be any parameter indicating the nature of the sentence. The information processing system 1 determines the detail level, which is an index of the detail degree of a sentence, based on the detection result of the characteristic value of the question sentence. The information processing system 1 outputs an answer sentence according to the determined detail level.

Note that it is likely that the more detailed answer to a question the user expects, the larger the characteristic value of the question sentence is. For example, a user who wants to know only the description of an event tends to enter a relatively simple question sentence having a smaller characteristic value, such as "What is this event"? On the other hand, a user who wants to know the description of not only an event but also the cause of the event tends to enter a relatively complicated question sentence having a larger characteristic value, such as "What is this event that occurred while driving the car as usual"? In this way, the characteristic value of a question sentence and the detail level of an answer sentence expected by the user are considered to have a certain correlation. Considering this correlation, the above-described operation of the information processing system 1 determines the detail level of an answer sentence according to the detection result of the characteristic value of a user's question sentence. Therefore, it is possible to provide an automatic answer that takes into consideration the detail level of an answer sentence expected by the user.

Next, the configuration of the information processing system 1 will be described in detail.

(Configuration of information processing device) As shown in FIG. 1, the information processing device 10 includes a display unit 11, an input unit 12, a voice reproduction unit 13, a communication unit 14, a storage unit 15, and a control unit 16.

The display unit 11 includes a display that displays information. The display may include a panel display that displays information on a display panel such as a liquid crystal panel or an organic Electro Luminescence (EL) panel. In this embodiment, the display unit 11 may display the character string of an ask-back sentence and an answer sentence output by the control unit 16 as will be described later.

The input unit 12 includes one or more input interfaces that accept an input from the user. For example, the input interface may include a keyboard that accepts a character input, a touch panel provided integrally with the display unit 11, and a microphone that accepts a voice input. In the description below, character information or voice information that is input to the input unit 12 is also referred to as input information.

The voice reproduction unit 13 includes one or more speakers. In this embodiment, the voice reproduction unit 13 may reproduce the voice of an ask-back sentence and an answer sentence output by the control unit 16 as will be described later.

The communication unit 14 includes one or more communication interfaces each corresponding to any predetermined communication standard. For example, the communication unit 14 may include a communication interface corresponding to a mobile communication standard such as 4G (4th Generation), the wired Local Area Network (LAN) standard, the wireless LAN standard, and the Universal Serial Bus (USB) standard. In this embodiment, the information processing device 10 can communicate with the server 20 via the communication unit 14 and the network 30.

The storage unit 15 includes one or more memories. In this embodiment, the memory may include a semiconductor memory, a magnetic memory, an optical memory, and so on. Each memory included in the storage unit 15 may function, for example, as the main storage device, the auxiliary storage device, or the cache memory. The storage unit 15 stores any predetermined information used for the operation of the information processing device 10.

The control unit 16 includes one or more processors. In this embodiment, the processor may include, for example, a general-purpose processor and a dedicated processor dedicated to specific processing. The control unit 16 controls the whole operation of the information processing device 10.

For example, the control unit 16 acquires input information, which includes a question sentence on the vehicle, from the input unit 12. The control unit 16 sends the input information to the server 20 via the communication unit 14. When an ask-back sentence or an answer sentence is received from the server 20 as will be described later, the control unit 16 outputs the ask-back sentence or the answer sentence. The ask-back sentence or answer sentence, which is output, may be displayed as characters by the display unit 11 or may be reproduced as voices by the voice reproduction unit 13.

(Configuration of server) As shown in FIG. 1, the server 20 includes a server communication unit 21, a server storage unit 22, and a server control unit 23.

The server communication unit 21 includes one or more communication interfaces each corresponding to any predetermined communication standard. For example, the server communication unit 21 may include a communication interface corresponding to each of the wired LAN standard, the wireless LAN standard, and the USB standard. In this embodiment, the server 20 can communicate with the information processing device 10 via the server communication unit 21 and the network 30.

The server storage unit 22 includes one or more memories. Each of the memories included in the server storage unit 22 may function, for example, as the main storage device, the auxiliary storage device, or the cache memory. The server storage unit 22 stores any predetermined information used for the operation of the server 20.

For example, the server storage unit 22 stores vehicle instruction manual data and image content. The instruction manual data includes, for example, the names of the functions mounted on the vehicle and the names of the devices. The instruction manual data may further include the description of the vehicle operation when each of the functions is executed, the description of the operation method of a device, the condition for activating a function, and the condition for terminating a function. The image content, which is related, for example, to the description of the operation method, may be images showing the operation contents. The instruction manual data and image content are used to determine an answer sentence for a user's question sentence. For example, when the question content is a vehicle operation method, the answer sentence may be determined by quoting the description sentence of the operation method included in the instruction manual data. Furthermore, the image content related to the description of the operation method may be displayed on the display unit 11.

In addition, the server storage unit 22 stores a knowledge database. The knowledge database includes a plurality of predetermined vehicle related keywords that can be used in a user's question sentence. The vehicle related keywords may include, for example, the names of functions and devices mounted on the vehicle and the words, such as "Does not move" and "How to open", included in the vehicle instruction manual data. Vehicle related keywords are used for recognizing question content.

The knowledge database further includes a plurality of predetermined question phrases that can be used in a user's question sentence. For example, the question phrases may include any phrases, such as "What to do"?, "What is this"?, and "What meaning"?, that can be used in a question sentence. Question phrases are used for recognizing question content.

The knowledge database further includes a plurality of predetermined answer phrases that can be used in an answer sentence. For example, the answer phrases may include any phrases, such as "Please stop immediately", "Not abnormal", and "The cause is . . . ", that can be used in an answer sentence. The answer phrases may include any phrases included in the vehicle's instruction manual data. As will be described below, the server control unit 23 determines an answer sentence using one or more answer phrases.

The server control unit 23 includes one or more processors. The server control unit 23 controls the whole operation of the server 20. The server control unit 23 updates the knowledge database, stored in the server storage unit 22, according to a user input received via the input interface, such as the keyboard connected to the server 20 or to a computer capable of communicating with the server 20. More specifically, the server control unit 23 may add, or may delete, a keyword, a question phrase, or an answer phrase entered via the input interface, to and from the knowledge database. According to such a configuration, the operator of the server 20 can edit keywords or the like included in the knowledge database.

The server control unit 23 receives input information, which includes a question sentence on the vehicle, from the information processing device 10. When the input information is voice, the server control unit 23 converts the voice into characters. The server control unit 23 analyzes the question sentence included in the input information. This analysis may include, for example, morphological analysis, syntax analysis, semantic analysis, context analysis, and anaphoric analysis. The server control unit 23 detects a vehicle related keyword and a question phrase, included in the question sentence, by referencing the knowledge database stored in the server storage unit 22.

The server control unit 23 determines whether the user's question content is identified, based on the result of the analysis of the question sentence and on the keywords and question phrases related to the detected vehicle.

If it is determined that the question content is not identified, the server control unit 23 determines an ask-back sentence to be returned to the user and sends it to the information processing device 10. The ask-back sentence includes a sentence to ask the user for additional information necessary for identifying the question content. Any predetermined algorithm, such as slot filling, can be used for determining the ask-back sentence. In response to the ask-back sentence sent from the server control unit 23 to the information processing device 10, the server control unit 23 is able to receive additional input information from the information processing device 10. The server control unit 23 may determine an ask-back sentence, send the determined ask-back sentence, and receive additional input information, repeatedly, until it is determined that the question content is identified.

On the other hand, if it is determined that the question content is identified, the server control unit 23 detects the characteristic value of the question sentence. In this embodiment, the "characteristic value" of a sentence is, for example, the number of characters, the number of words, the number of content words, or the number of dependencies included in a sentence as described above. Note that the characteristic value is not limited to those given above but may be any parameter indicating the nature of the sentence.

Based on the detection result of the characteristic value of the question sentence, the server control unit 23 determines the detail level that is an index of the detail degree of the sentence. The higher the detail level is, the more detail the sentence is. For example, the server control unit 23 may increase the detail level as the characteristic value of the question sentence is larger. For each detail level value that is used, the server storage unit 22 may store, in advance, the range of characteristic values of a question sentence. For example, in the example shown in FIG. 2, the range "1 or more and less than 50" of the characteristic value of a question sentence is associated with the detail level "1", the range "50 or more and less than 100" of the characteristic value of a question sentence is associated with the detail level "2", and the range "100 or more" of the characteristic value of a question sentence is associated with the detail level "3". Note that the association between the range of characteristic values of a question sentence and the detail level is not limited to the example shown in the example shown in FIG. 2.

The server control unit 23 determines an answer sentence according to the determined detail level by using the instruction manual data, the image content, and the knowledge database stored in the server storage unit 22. More specifically, for each detail level value that is used, the server storage unit 22 stores, in advance, the range of characteristic values of an answer sentence. For example, in the example shown in FIG. 2, the detail level "1" is associated with the range "1 or more and less than 30" of the characteristic value of an answer sentence, the detail level "2" is associated with the range "30 or more and less than 60" of the characteristic value of an answer sentence, and the detail level "3" is associated with the range "60 or more" of the characteristic value of an answer sentence. Note that the association between the detail level and the range of the characteristic values of an answer sentence is not limited to the example shown in FIG. 2. The server control unit 23 determines an answer sentence in such a way that the characteristic value of an answer sentence falls within the range of the characteristic value corresponding to the determined detail level. For example, the server control unit 23 determines a candidate sentence that is a candidate for the answer sentence, and modifies the candidate sentence until the characteristic value of the candidate sentence is included in the range corresponding to the detail level determined as described above. Any predetermined algorithm, such as a neural network, can be used to determine and modify the candidate sentence. A candidate sentence may be modified, for example, by adding an answer phrase to the candidate sentence and by changing or deleting an answer phrase included in the candidate sentence. When the characteristic value of the candidate sentence falls within the range, the server control unit 23 determines the candidate sentence as the answer sentence. Therefore, the characteristic value of a determined answer sentence differs according to the detail level. For example, as the detail level is higher, the number of characters, the number of words, the number of content words, or the number of dependencies (that is, the characteristic value of answer sentence) included in the answer sentence may be larger. Then, the server control unit 23 sends the determined answer sentence to the information processing device 10.

Figure 3:
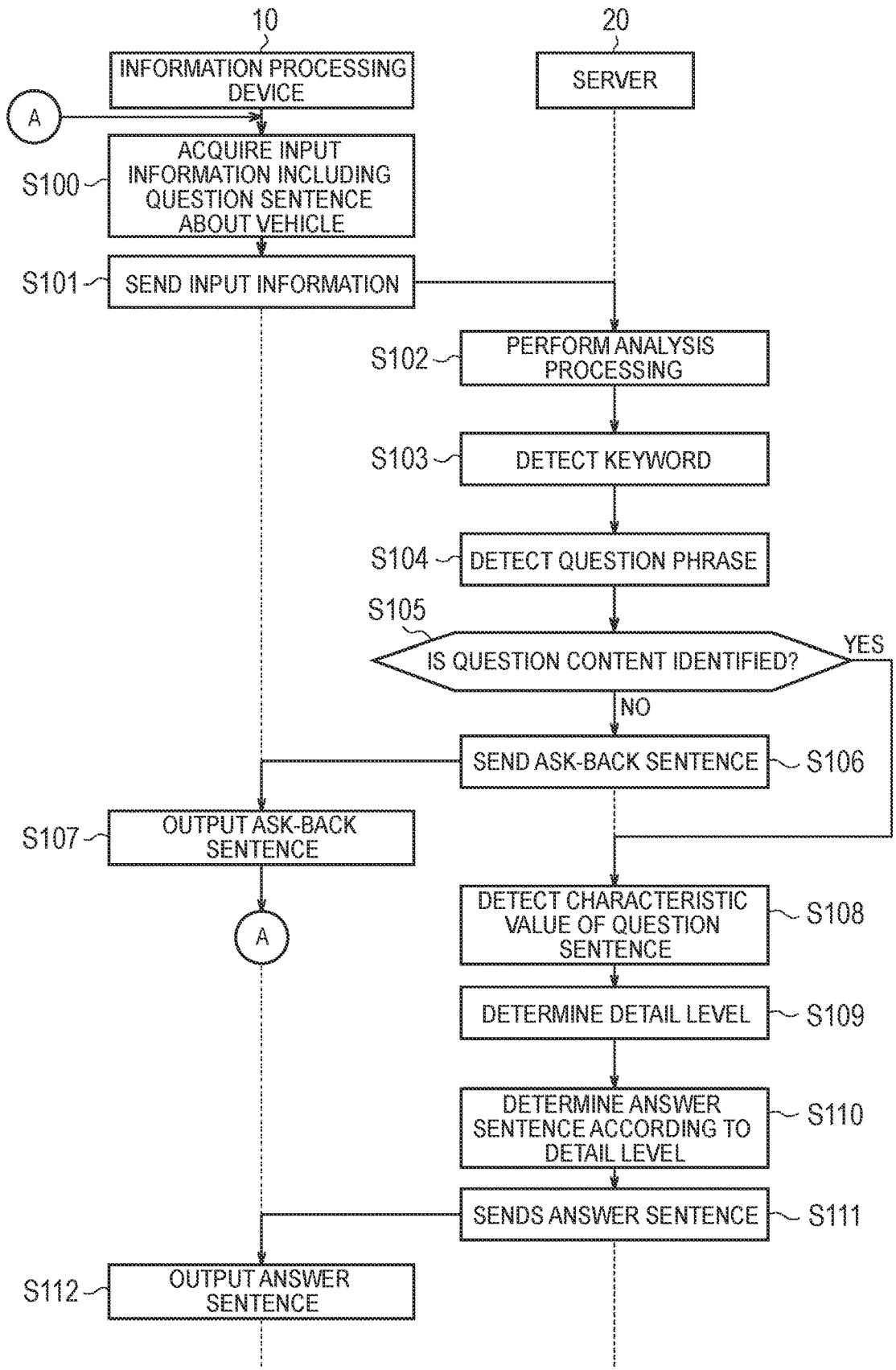
FIG. 3 is a sequence diagram showing the operation of the information processing system.

(Operation flow of information processing system) With reference to FIG. 3, the flow of the above-described operation of the information processing system 1 will be described.

Step S100: The information processing device 10 acquires user's input information including a question sentence about the vehicle.

Step S101: The information processing device 10 sends the input information, acquired in step S100, to the server 20.

Step S102: The server 20 analyzes the question sentence included in the input information received from the information processing device 10. When the input information is voice, the server 20 converts the voice into characters and then analyzes the question sentence.

Step S103: The server 20 references the knowledge database stored in the server storage unit 22 and detects a keyword related to the vehicle included in the question sentence.

Step S104: The server 20 references the knowledge database stored in the server storage unit 22 and detects a question phrase included in the question sentence.

Step S105: The server 20 determines whether the user's question content is identified based on the processing result of the analysis processing of the question sentence and on the detected keyword and question phrase related to the vehicle. If it is determined that the question content is not identified (step S105—No), the processing proceeds to step S106. On the other hand, if it is determined that the question content is identified (step S105—Yes), the processing proceeds to step S108.

Step S106: If it is determined in step S105 that the question content is not identified (step S105—No), the server 20 determines an ask-back sentence to be sent to the user and sends it to the information processing device 10.

Step S107: The information processing device 10 outputs the ask-back sentence received from the server 20. After that, the processing returns to step S100.

Step S108: If it is determined that the question content is identified in step S105 (step S105—Yes), the server 20 detects the characteristic value of the question sentence.

Step S109: The server 20 determines the detail level based on the detection result of the characteristic value of the question sentence.

Step S110: The server 20 determines the answer sentence according to the determined detail level.

Step S111: The server 20 sends the determined answer sentence to the information processing device 10.

Step S112: The information processing device 10 outputs the answer sentence received from the server 20.

(Specific example of question sentence and answer sentence) With reference to FIG. 4 to FIG. 6, a specific example of an answer sentence, which is output in response to a user's question sentence in the information processing system 1, will be described below.

FIG. 4 is a diagram showing a specific example of a user's question sentence and an answer sentence that is returned in response to the question sentence. The question sentence and the answer sentence are sent and received when an event occurs. FIG. 4 shows three question sentences, each of which demands an explanation of the event, and three answer sentences each of which includes at least the description of the event.

Note that the three question sentences have different characteristic values from each other. More specifically, the question sentence in the first row is "What is this event?" The characteristic value (for example, the number of characters) of this question sentence is relatively small. Therefore, the detail level corresponding to the question sentence in the first row is "1". The question sentence in the second row is "What is this event that occurred after doing operation A"? The characteristic value of this question sentence is larger than that of the question sentence in the first row. Therefore, the detail level corresponding to the question sentence in the second row is "2" that is larger than that of the question sentence in the first row. The question sentence in the third row is "What is this event that occurred after doing operation A that occurred after doing operation B"? The characteristic value of this question sentence is even larger than that of the question sentence in the second row. Therefore, the detail level corresponding to the question sentence in the third row is "3" that is even larger than that of the question sentence in the second row.

The answer sentence in the first row corresponding to the detail level "1" is "It is event P". The characteristic value of this answer sentence is relatively small. The answer sentence in the second row corresponding to the detail level "2" is "It is event P. The event occurs when the vehicle is in state Q". The characteristic value of this answer sentence is larger than that of the answer sentence in the first row. The answer sentence in the third row corresponding to the detail level "3" is "It is event P. The event occurs when the vehicle is in state Q. Please do operation R". The characteristic value of this answer sentence is even larger than that of the answer sentence in the second row. Thus, the larger the characteristic value of the question sentence is, the larger the characteristic value of the answer sentence that is output.

FIG. 5 is a diagram showing a specific example of a user's question sentence and an answer sentence that is returned in response to the question sentence. The question sentence and the answer sentence are sent and received when the immobilizer provided in the vehicle is activated. FIG. 5 shows three pairs of a question sentence and an answer sentence.

In the first row in FIG. 5, the question sentence is "The key mark is lit on the car". This question sentence simply says about the event that the key mark is lit. The characteristic value (e.g., the number of characters) of this question sentence is relatively small. Therefore, the detail level determined based on the characteristic value of the question sentence is "1" that is relatively small. The answer sentence is "The immobilizer is in operation. Do not leave the key inside the car when leaving the car". This answer sentence says about the description of the event that the lighting of the key mark indicates the operation of the immobilizer and the general notes on the immobilizer. The characteristic value of this answer sentence is relatively small.

In the second row in FIG. 5, the question sentence is "The key mark is lit on the car. What is this"? This question sentence says about the event that the key mark is lit and, at the same time, demands an explanation of the event. The characteristic value of this question sentence is larger than that of the question sentence in the first row. Therefore, the detail level determined based on the characteristic value of this question sentence is "2" that is larger than that of the question sentence in the first row. The answer sentence is "This is the operation indicator of the immobilizer. The engine is started only by the previously registered key. Do not leave the key inside the car when leaving the car". This answer sentence adds the notes on the immobilizer to indicate that the engine can be started only the registered key. The characteristic value of this answer sentence is larger than that of the answer sentence in the first row.

In the third row in FIG. 5, the question sentence is "The key mark is displayed on the meter of the car when the car is stopped. When is this key mark displayed"? The question sentence says about the event that the key mark is lit, includes the description of the situation until the key mark was lit, and further demands an explanation of the cause of event generation. The characteristic value of this question sentence is larger than that of the question sentence in the second row. Therefore, the detail level determined based on the characteristic value of this question sentence is "3" that is larger than that of the question sentence in the second row. The answer sentence is "This is the operation indicator of the immobilizer. When the power switch is turned OFF, the indicator flashes to inform about the operation of the immobilizer system". This answer sentence includes the description of the cause why the indicator flashed. The characteristic value of this answer sentence is even larger than that of the answer sentence in the second row.

FIG. 6 is a diagram showing a specific example of a user's question sentence and an answer sentence that is returned in response to the question sentence. The question sentence and the answer sentence are sent and received when the intrusion-detection automatic alarm provided in the vehicle is activated. FIG. 6 shows three pairs of a question sentence and an answer sentence.

In the first row in FIG. 6, the question sentence is "I want to stop the terrible sound from the car". This question sentence says about the event that a sound is generated from the vehicle and, at the same time, demands an explanation of a way to stop the generation of the sound. The characteristic value (e.g., the number of characters) of this question sentence is relatively small. Therefore, the detail level determined based on the characteristic value of this question sentence is "1" that is relatively low. The answer sentence is "The intrusion-detection automatic alarm is activated. Unlock the door or turn on the power switch if you are inside the car". This answer sentence says about the description of the event that the generated sound is the sound of the intrusion-detection automatic alarm and a way to stop the generation of the sound. The characteristic value of this answer sentence is relatively small.

In the second row in FIG. 6, the question sentence is "A big alarm sounded from the car. What happened"? This question sentence says about the event that a sound is garneted from the vehicle and, at the same time, demands an explanation of the cause of sound generation. The characteristic value of this question sentence is larger than that of the question sentence in the first row. Therefore, the detail level determined based on the characteristic value of this question sentence is "2" that is larger than that of the question sentence in the first row. The answer sentence is "The intrusion-detection automatic alarm is activated. There is a possibility that the alarm has responded to a person or a pet left in the car". This answer sentence says about the description of the event that the generated sound is the sound from the intrusion-detection automatic alarm and, in addition, the cause of sound generation. The characteristic value of this answer sentence is larger than that of the answer sentence in the first row.

In the third row in FIG. 6, the question sentence is "I was in the car for a while after parking and a terrible alarm sounded when I tried to get out of the car. I think it is probably intrusion detection. Why did it work"? This question sentence says about the event that the sound was generated from the vehicle, includes the description of the situation until the sound was generated, estimates that the sound is an intrusion detection sound, and demands an explanation of the cause of the generation of the event. The characteristic value of this question sentence is larger than that of the question sentence in the second row. Therefore, the detail level determined based on the characteristic value of this question sentence is "3" that is larger than that of the question sentence in the second row. The answer sentence is "The automatic alarm sometimes works when a person in the car unlocks the door, or opens the hood or the trunk, with the lock lever. The automatic alarm may also be activated when you leave behind a thing moving in the car". This answer sentence includes a detailed description of the cause of sound generation. The characteristic value of this answer sentence is even larger than that of the answer sentence in the second row.

As described above, the information processing system 1 according to this embodiment determines the detail level, which is an index of sentence detail degree, based on the detection result of the characteristic value of a question sentence about the vehicle. After that, an answer sentence corresponding to the determined detail level is output. As described above, it is known that the characteristic value of a question sentence and the detail level of an answer sentence expected by the user have a certain correlation. Considering this correlation, the information processing system 1 determines the detail level of the answer sentence according to the detection result of characteristic value of the user's question sentence. This makes it possible to automatically answer the question considering the detail level of the answer sentence expected by the user.

Although the present disclosure has been described with reference to the drawings and the embodiment, it should be noted that those skilled in the art can easily make various modifications and corrections based on the present disclosure. Therefore, it should be noted that those modifications and corrections fall within the scope of the present disclosure. For example, it is possible to rearrange the functions included in each unit or each step in such a way that the functions are not logically contradictory and to combine a plurality of units or steps into one or to divide each unit or step into a plurality of units or steps.

For example, in the embodiment described above, at least a part of the processing executed by the server 20 may be executed by the information processing device 10. For example, the information processing device 10 may execute one or more of steps S102 to S106 and S108 to S111 shown in FIG. 3. In addition, the information processing device 10 and the server 20 may cooperatively execute at least a part of the processing executed by the information processing device 10 or by the server 20. Furthermore, the information processing device 10 may alone execute all processing executed by the server 20.

In the embodiment described above, the operation flow of the information processing system 1 is described with reference to FIG. 3. Note that the present disclosure is not limited to this operation flow. For example, some of the steps included in the operation flow or some operations included in one step may be omitted. In addition, the order of a plurality of steps may be changed within a range not logically contradictory.

Furthermore, in the embodiment described above, a part or all of the configuration and the functions of the information processing device 10 may be mounted on the vehicle. In such a case, for example, an Electronic Control Unit (ECU) mounted on the vehicle may function similarly to the control unit 16. A configuration in which the configuration and functions of the information processing device 10 are distributed among a plurality of devices is also possible.

In the embodiment described above, the configuration is described in which the detail level is determined based on one characteristic value of a question sentence. Note that the present disclosure is not limited to this configuration. For example, it is also possible to determine the detail level based, not on one characteristic value of a question sentence, but on the total value or the maximum value of a plurality of characteristic values (such as the number of characters and the number of words) of the question sentence.

In the embodiment described above, the configuration is described in which the "characteristic value" of a sentence is the number of characters, the number of words, the number of content words, or the number of dependencies included in the sentence. Note that the present disclosure is not limited to this configuration. For example, the "characteristic value" of a sentence may be the total value or the maximum value of scores that are set for the words and/or phrases included in the sentence. In such a case, the server storage unit 22 may store, in advance, the score corresponding to each word and/or phrase. The server control unit 23 may determine the total value or the maximum value of scores, which are set for the words and/or phrases included in a question sentence, as the characteristic value of the question sentence. Similarly, the server control unit 23 may determine the total value or the maximum value of scores, which are set for the words and/or phrases included in a candidate sentence of an answer sentence, as the characteristic value of the candidate sentence.

In addition, a processor mounted on a general-purpose electronic device can function as the control unit 16 of the information processing device 10 according to the embodiment described above. More specifically, a program describing the processing for executing the functions of the information processing device 10 according to this embodiment is prepared and, with this program stored in the memory of the electronic device, the processor of the electronic device reads and executes this program to function as the control unit 16.

What is claimed is:

1. An information processing method for use in a vehicle, the information processing method comprising:
   acquiring, by an input interface, input information entered by a user, the input information including a question sentence;
   detecting, by a processor, a characteristic value of the question sentence included in the input information acquired from the input interface, the characteristic value of the question sentence being a number of characters, a number of words, or a number of content words included in the question sentence;
   outputting, by a display or a speaker, an answer sentence according to a detail level, the detail level being an index indicating a detail degree of a sentence, and the detail level being determined based on the characteristic value of the question sentence, wherein
   the detail degree of the question sentence increases as the characteristic value of the question sentence increases,
   a characteristic value of the answer sentence which the display or the speaker outputs is determined according to the detail level,
   the characteristic value of the answer sentence is a number of characters, a number of words, a number of content words, or a number of dependencies included in the answer sentence, and
   the characteristic value of the answer sentences increases as the detail level of the question sentence increases.

2. The information processing method according to claim 1, wherein
   the question sentence includes a keyword representing an operation of the vehicle when a function of the vehicle is executed.

3. The information processing method according to claim 2, wherein content of the answer sentence is determined as being at least one of a description of the function corresponding to the operation, a description of a cause why the vehicle performs the operation, and a description of a way to handle the operation.

4. A non-transitory storage medium storing a program, wherein the program causes an information processing device that is used in a vehicle to:
   acquire, from an input interface, input information entered by a user, the input information including a question sentence;
   detect, by a processor, a characteristic value of the question sentence included in the input information acquired from the input interface, the characteristic value of the question sentence being a number of characters, a number of words, or a number of content words included in the question sentence;

output, by a display or a speaker, an answer sentence according to a detail level, the detail level being an index indicating a detail degree of a sentence, and the detail level being determined based on the characteristic value of the question sentence, wherein the detail degree of the question sentence increases as the characteristic value of the question sentence increases, a characteristic value of the answer sentence which the display or the speaker outputs is determined according to the detail level, the characteristic value of the answer sentence is a number of characters, a number of words, a number of content words, or a number of dependencies included in the answer sentence, and the characteristic value of the answer sentences increases as the detail level of the question sentence increases.

5. An information processing device for use in a vehicle, the information processing device comprising:
   an input interface configured to acquire input information entered by a user, the input information including a question sentence;
   a control unit configured to detect, from the input information acquired by the input interface, a characteristic value of the question sentence, the characteristic value of the question sentence being a number of characters, a number of words, or a number of content words included in the question sentence; and
   a display or a speaker configured to output an answer sentence according to a detail level, the detail level being an index indicating a detail degree of a sentence, and the detail level being determined based on the characteristic value of the question sentence, wherein
   the detail degree of the question sentence increases as the characteristic value of the question sentence increases,
   a characteristic value of the answer sentence which the display or the speaker outputs is determined according to the detail level,
   the characteristic value of the answer sentence is a number of characters, a number of words, a number of content words, or a number of dependencies included in the answer sentence, and
   the characteristic value of the answer sentences increases as the detail level of the question sentence increases.

6. An information processing system comprising:
   an information processing device for use in a vehicle, the information processing device comprising:
      an input interface configured to acquire input information entered by a user, the input information including a question sentence;
      a first processor; and
      a display or a speaker; and
   a server configured to communicate with the information processing device, the server comprising a second processor, wherein
   the first processor or the second processor is configured to:
      detect, from the input information acquired by the input interface, a characteristic value of the question sentence, the characteristic value of the question sentence being a number of characters, a number of words, or a number of content words included in the question sentence; and
      determine a detail level that is an index indicating a detail degree of a sentence based on the characteristic value of the question sentence,
   the detail degree of the question sentence increases as the characteristic value of the question sentence increases,
   the display or the speaker is configured to output an answer sentence according to the detail level,
   a characteristic value of the answer sentence which the display or the speaker outputs is determined according to the detail level,
   the characteristic value of the answer sentence is a number of characters, a number of words, a number of content words, or a number of dependencies included in the answer sentence,
   the characteristic value of the answer sentences increases as the detail level of the question sentence increases.

* * * * *